US005691409A

United States Patent [19]

Ishida et al.

[11] Patent Number: 5,691,409
[45] Date of Patent: Nov. 25, 1997

[54] PHENOLIC RESIN MOLDING MATERIAL

[75] Inventors: Tamotsu Ishida; Masatoshi Yamoto, both of Fujieda, Japan

[73] Assignee: Sumitomo Bakelite Company Limited, Tokyo, Japan

[21] Appl. No.: 680,543

[22] Filed: Jul. 9, 1996

[30] Foreign Application Priority Data

| Jul. 12, 1995 | [JP] | Japan | 7-176373 |
| Jul. 12, 1995 | [JP] | Japan | 7-176374 |
| Jul. 25, 1995 | [JP] | Japan | 7-189603 |
| Dec. 25, 1995 | [JP] | Japan | 7-336543 |

[51] Int. Cl.$^6$ ............................ C08L 61/00
[52] U.S. Cl. ............................ 524/509; 525/138; 525/145
[58] Field of Search .................... 525/138, 145; 524/509

[56] References Cited

U.S. PATENT DOCUMENTS

| 2,968,641 | 1/1961 | Roberts et al. | 525/145 |
| 3,234,176 | 2/1966 | Bata et al. | 525/145 |
| 3,546,157 | 12/1970 | Mercer et al. | 525/145 |
| 3,752,865 | 8/1973 | Scardiglia et al. | 525/138 |

FOREIGN PATENT DOCUMENTS

| 933053 | 9/1973 | Canada | 525/145 |
| 46285 | 2/1982 | European Pat. Off. | 525/138 |
| 301294 | 11/1992 | Germany . | |
| 58-142933 | 8/1983 | Japan | 525/145 |
| 59-207960 | 11/1984 | Japan | 525/14 |

*Primary Examiner*—Ralph H. Dean
*Attorney, Agent, or Firm*—Browdy and Neimark

[57] ABSTRACT

The present invention provides a phenolic resin molding material high in flowability and heat stability in the molten state and excellent in curability at high temperatures which contains (a) a high ortho-novolak type phenolic resin having a number-average molecular weight of 350–500 and an ortho-bond/para-bond ratio of 1.5–2.5, (b) hexamethylene-tetramine, (c) a low-molecular polyolefin compound and (d) a filler. This phenolic resin molding material can further contain a crystalline phenolic compound having two or more benzene rings and/or a monohydric aliphatic alcohol to further improve the flowability, heat stability and curability.

20 Claims, No Drawings

PHENOLIC RESIN MOLDING MATERIAL

BACKGROUND OF THE INVENTION

1. Field of the Invention

The present invention relates to phenolic resin molding materials which are excellent in heat stability and curability and which can be molded at low pressures to give molded articles with formation of less flash.

2. Description of the Related Art

Phenolic resin molding materials are superior in balance of heat resistance, electrical characteristics, mechanical characteristics, dimensional stability, etc. and are used in a wide variety of fields such as electrical parts. In general, the phenolic resin molding materials are molded by injection molding, and in the cylinder of an injection molding machine, they increase in viscosity to lose flowability and cause deterioration in heat stability of the molten resins with progress of curing reaction of the resins in the plasticized molten state at 90°–120° C. Therefore, conventional phenolic resin molding materials suffer from the problems that when they are injection-molded, heat stability of the molding materials molten in the cylinder of an injection molding machine is inferior and the latitude in good molding conditions is narrow.

Furthermore, general phenolic resin molding materials have a relatively high viscosity even in the plasticized state in the cylinder at 90°–120° C. and the viscosity abruptly increases with curing in the stage of being injected into a mold at about 160°–180° C. in order to cure the materials, and thus, the flowability is maintained only for a short time. Therefore, in order to obtain good molded articles, it is necessary to inject the materials into a mold in a short time and under a high pressure. As a result, a residual stress is generated in the molded articles in the mold, and when the stress diffuses in the molded articles in the cooling process after released from the mold, warpage or distortion is apt to occur in the molded articles. Moreover, at the time of injecting the resin into the mold under a high pressure, a space is often formed between the molds, which inevitably causes formation of flashes.

Hitherto, for the solution of these problems, the molding has sometimes been carried out while reducing the melt viscosity of the molding materials, that is, enhancing the flowability and reducing the injection pressure. In this case, however, occurrence of flashes can be diminished, but because of the slow curing, the molding cycle becomes longer, and, hence, this method can hardly be practically employed.

As a result of intensive research conducted to solve these problems, the present invention has been accomplished. That is, the object of the present invention is to provide a phenolic resin molding material which is excellent in heat stability in the molten state in the cylinder of an injection molding machine, very low in melt viscosity and excellent in curability.

SUMMARY OF THE INVENTION

The present invention basically relates to a phenolic resin molding material which comprises (a) a high ortho-novolak type phenolic resin having a number-average molecular weight of 350–500 and an ortho-bond/para-bond ratio (hereinafter referred to as "o/p ratio") of 1.5–2.5, (b) hexamethylenetetramine, (c) a low-molecular polyolefin compound, and (d) a filler.

The above phenolic resin molding material comprising the components (a)–(d) of the present invention can further contain (e) a crystalline phenolic compound having two or more benzene rings to impart to the material the characteristic of being able to be molded under a lower pressure, and in this case, furthermore (f) a compound having two or more hydroxyl groups on a benzene ring may be added into the material comprising (a)–(e).

The above phenolic resin molding material comprising the components (a)–(d) of the present invention can further contain (g) a monohydric aliphatic alcohol.

Moreover, the above phenolic resin molding material comprising the components (a)–(d) of the present invention can contain both the crystalline phenolic compound (e) having two or more benzene rings and the monohydric aliphatic alcohol (g) in combination. In this case, the compound (f) having two or more hydroxyl groups on a benzene ring may also be added into the material.

In general, novolak type phenolic resins have a molecular weight (which means the number-average molecular weight hereinafter) of 600–1000, but when the molecular weight is relatively small, namely, 350–500, heat stability in molten state is improved and flowability in a mold is also improved because of the low melt viscosity. The molecular weight may be lower than 350, but in this case the resin can hardly become solid, and workability in production of the molding materials is deteriorated. If the molecular weight is higher than 500, the heat stability and the flowability are deteriorated and the resin can hardly be applied to the present invention. The more preferred range of the molecular weight is 380–450.

In the present invention, the o/p ratio of the novolak type phenolic resin is 1.5–2.5, and when the ortho-bonds are increased to this range, the activation energy of the resin increases and curability of the resin in a mold is improved. If the o/p ratio is lower than 1.5, the resin is insufficiently cured in a mold and requires a long molding cycle. If it is higher than 2.5, the resin can hardly be produced. The ratio is more preferably in the range of 1.8–2.3.

As the hexamethylenetetramine (b), powdery one which is ordinarily used as a curing agent for phenolic resins can be employed. The amount of the hexamethylenetetramine is usually 7–30 parts by weight, preferably 12–20 parts by weight per 100 parts by weight of the phenolic resin.

Examples of the low-molecular polyolefin compound (c) are low-molecular polypropylene, low-molecular polyethylene and the like. These compounds have a molecular weight of 300–30000. When the molding material is molten and charged in the cylinder of an injection molding machine, these compounds diminish the generation of heat caused by the shear given by a screw and a cylinder wall and retards the progress of curing to improve heat stability. Furthermore, they have an action to reduce the viscosity of the molding material in the molten state of 80°–120° C. The molecular weight of these compounds is preferably 300–3000. More preferred are polyethylenes having a molecular weight of 500–1500 to markedly reduce the viscosity. The amount of these compounds is 0.1–10 parts by weight based on 100 parts by weight of the phenolic resin or based on the total weight of the phenolic resin and the crystalline phenolic compound when the latter is contained. If the amount is less than 0.1 part by weight, the above-mentioned action of the compounds is small, and if it is more than 10 parts by weight, the stable charging in the injection molding machine becomes difficult.

Examples of the filler (d) used in the phenolic resin molding material of the present invention are organic ones such as wood flours, pulp flours, ground products of various fabrics and ground products of phenolic resin laminated sheets and molded articles, inorganic powders such as silica, alumina, aluminum hydroxide, glass, talc, clay, mica, calcium carbonate and carbon, and inorganic fibers such as glass fibers and carbon fibers. At least one of them can be used. The proportion of the filler in the molding material is such that the amount of the resin component containing hexamethylenetetramine is 20–70% by weight and that of the filler is 80–30% by weight. Furthermore, the phenolic resin molding material of the present invention may further optionally contain various additives such as lubricant, colorant, curing accelerator and flame retardant.

The crystalline phenolic compound (e) having two or more benzene rings used in the present invention means a phenolic compound having two or more benzene rings which is solid at room temperature, has a definite melting point, becomes a low-viscosity liquid upon melting, and cures upon reacting with a curing agent for phenolic resins such as hexamethylenetetramine. The crystalline phenolic compound includes, for example, bisphenol compounds such as bisphenol A, bisphenol F, bisphenol AD, bisphenol Z and bisphenol S and derivatives thereof, biphenol and derivatives thereof, compounds containing three benzene rings such as trisphenol AP and compounds containing four benzene rings. One or two or more of these compounds can be used. These crystalline phenolic compounds having two or more benzene rings are solid at room temperature and rapidly melt by heating at the time of injection molding to have low viscosity, and therefore these are used for giving to the phenolic resin molding material a property of being moldable under lower pressure than usual. Normal novolak resins can also be used as phenolic resins, but the melt viscosity can further be reduced by using novolak resins of lower molecular weight and, on the one hand, the amount of the expensive crystalline phenolic compound used can be reduced. Bisphenol F and bisphenol A are preferred as the crystalline phenolic compounds and especially preferred is bisphenol F.

The compound (f) having two or more hydroxyl groups on the benzene ring is used for improving the curing rate while maintaining the low viscosity without damaging the above characteristics of the crystalline phenolic compound. As the compound (f), there may be used, for example, one or more of resorcin, hydro-quinone, catechol, fluoroglucinol, pyrogallol, and derivatives thereof. Resorcin is especially preferred for acceleration of curing.

In the present invention, the ratio of the phenolic resin (a) and the crystalline phenolic compound (e) having two or more benzene rings can be unlimitedly chosen, but preferably (a)/(e)=20/80–90/10. If the amount of the component (e) is small, the above-mentioned characteristics of crystalline compound cannot be sufficiently exhibited, and if it is large, the curing is retarded. With increase in the proportion of the component (a), the viscosity of the molten resin increases and curability is improved. Therefore, the component (a) can be added in an any amount within the above range depending on the purpose. The compound (f) having two or more hydroxyl groups on the benzene ring is used for acceleration of curing, and the preferable proportion is shown by the total amount of the component (a) and the component (e)/the component (f)=99/1–90/10. If the amount of the component (f) is smaller than this range, the effect to accelerate the curing decreases, and if it is larger than the range, the properties of cured product decrease.

Examples of the monohydric aliphatic alcohol (g) are primary alcohols such as methanol, ethanol, propyl alcohol, butyl alcohol, amyl alcohol, hexyl alcohol, heptyl alcohol and octyl alcohol, and secondary and tertiary alcohols which are isomers of the above primary alcohols, such as isopropyl alcohol and isobutyl alcohol. One or two or more of them can be used. These alcohols have the action to reduce the viscosity of the molding material in the molten state at 80°–120° C. in charging of the molding material in the cylinder of an injection molding machine. Further, when boiling point of these alcohols is near the above temperature range, they have the effect to diminish by the evaporation latent heat the generation of heat caused by the shear which is applied to the molding material by the screw and the cylinder wall, and thus they improve heat stability of the molding material by controlling the progress of the curing reaction. These alcohols are preferably those which have 5 or less carbon atoms and have a boiling point of 80°–140° C. More preferred is amyl alcohol. These alcohols are used in an amount of 1–20 parts by weight per 100 parts by weight of the phenolic resin. If the amount is smaller than 1 part by weight, the above effect is low, and if it is larger than 20 parts by weight, the charging of the molten molding material in the injection molding machine becomes difficult.

The phenolic resin molding material of the present invention can be prepared by blending the resin component, hexamethylenetetramine, filler and other additives, kneading the blend by a roll mill, a twin-screw kneader, etc. and grinding the kneaded product.

In the phenolic resin molding material of the present invention, a high ortho-novolak type phenolic resin having an o/p ratio of 1.5–2.5 and a low molecular weight of 350–500 is used as a phenolic resin and additionally a low-molecular polyolefin compound is contained. Such phenolic resin molding material has a melt viscosity of $10^3$ Pa.s or lower at 100° C. and has a low viscosity in the molten state in the cylinder of an injection molding machine, That is, the activation energy of the phenolic resin is high and the melt viscosity thereof becomes very low, and the phenolic resin is excellent in heat stability in the molten state at 80°–120° C. Moreover, since the material can be filled in the mold cavity under a low pressure without applying an extra pressure at the time of injection molding, occurrence of flash can be highly inhibited. Further, since the molding material can be molten at a temperature of 70°–80° C. in the cylinder of an injection molding machine, the acceleration of curing reaction can be further inhibited and the heat stability is conspicuously improved. Moreover, the material is excellent in flowability and curability in a mold of 160°–200° C. Accordingly, the phenolic resin molding material of the present invention is wide in the latitude of molding conditions in injection molding and is excellent in continuous moldability.

In the case of the phenolic resin molding material of the present invention additionally containing the crystalline phenolic compound having two or more benzene rings, the curability is further improved when the compound having two or more hydroxyl groups on the benzene ring is added. Since the low-molecular polyolefin compound is contained, the material is low in the melt viscosity and is improved in flowability and heat stability. Accordingly, by properly selecting the amount of the resin component and that of the low-molecular polyolefin compound, and optionally the amount of the compound having two or more hydroxyl groups on the benzene ring, there can be obtained a phenolic resin molding material having excellent curability, low melt viscosity and furthermore high heat stability together in a wide range. Such phenolic resin molding material has a melt viscosity of $10^3$ Pa.s or lower at 100° C., and furthermore the melt viscosity is reduced to lower than $10^2$ Pa.s depending on the proportion of the crystalline phenolic compound and the low-molecular polyolefin compound, and the viscosity in the molten state in the cylinder of an injection molding machine is very low.

When the monohydric aliphatic alcohol is added to the phenolic resin molding material of the present invention, the melt viscosity is further lowered and the flowability and heat stability are improved. Accordingly, by properly selecting the amount of the resin component, that of the monohydric aliphatic alcohol and that of the low-molecular polyolefin compound, there can be obtained a phenolic resin molding material having excellent curability, low melt viscosity and furthermore high heat stability together in a wide range. Such phenolic resin molding material has a melt viscosity of $10^3$ Pa.s or lower at 100° C., and furthermore the melt viscosity is reduced to lower than $10^2$ Pa.s depending on the proportion of the monohydric aliphatic alcohol and the low-molecular polyolefin compound, and the viscosity in the molten state in the cylinder of an injection molding machine is very low.

When the crystalline phenolic compound having two or more benzene rings and the monohydric aliphatic alcohol are added in combination to the phenolic resin molding material of the present invention, the melt viscosity is further lowered and the flowability and heat stability are improved. Addition of the compound having two or more hydroxyl groups on the benzene ring further improves curability. Accordingly, by properly selecting the amount of the resin component, that of the compound having two or more hydroxyl groups on the benzene ring, that of the monohydric aliphatic alcohol and that of the low-molecular polyolefin compound, there can be obtained a phenolic resin molding material having excellent curability, low melt viscosity and furthermore high heat stability together in a wide range. Such phenolic resin molding material has a melt viscosity of $10^3$ Pa.s or lower at 100° C., and furthermore the melt viscosity is reduced to lower than $10^2$ Pa.s depending on the proportion of the crystalline phenolic compound, the monohydric aliphatic alcohol and the low-molecular polyolefin compound, and the viscosity in the molten state in the cylinder of an injection molding machine is very low.

The present invention will be explained by the following examples, where all parts are by weight.

The compositions having the blending ratios of the components as shown in Tables 1–4 were kneaded by a heating roll to obtain phenolic resin molding materials. Melt viscosity of the resulting molding materials was measured, and furthermore they were injection molded and stability in the cylinder and curability were measured. The results are also shown in Tables 1–4.

Methods of Measurement

1. Melt viscosity: This was measured by Shimadzu flow tester (CFT-500C manufactured by Shimadzu Seisakusho, Ltd.).

2. Heat stability: The time from the starting of melting to curing was measured by Laboplastmill (Model C manufactured by Toyo Seiki Co.).

3. Stability in cylinder: The molding material was subjected to 20 shot continuous molding (cylinder temperature: 90° C.; mold temperature: 175° C.; the same conditions were employed in the subsequent moldings) into a test piece of 60 mmφ×4 mm (hereinafter referred to as merely "test piece") and, thereafter, was left in the state as metered, and after lapse of a certain period of time, injection was carried out. The injection molding was carried out after the changed leaving time, and the longest leaving time after which the molten material flowed and could be sufficiently filled in the mold, was obtained.

4. Curability: The time for which the molded test piece was retained in the mold was changed, and occurrence of blisters on the surface of the test piece was examined.

5. Injection pressure: The minimum pressure under which the material could be continuously molded into a test piece without causing failure such as short shot is shown by hydraulic gauge pressure of the injection molding machine.

6. Formation of flash: Flash formed on the test piece was visually observed.

TABLE 1

|  |  | Example | | | | Comparative Example (Amount: Part by weight) | | | |
|---|---|---|---|---|---|---|---|---|---|
|  |  | 1 | 2 | 3 | 4 | 1 | 2 | 3 | 4 |
| Novolak resin | | | | | | | | | |
| Number-average molecular weight | | 405 | 395 | 405 | 405 | 405 | 420 | 550 | 850 |
| o/p ratio | | 1.8 | 2.1 | 1.8 | 1.8 | 1.8 | 1.2 | 2.1 | 0.8 |
| Composition | Novolak resin | 44 | 44 | 44 | 44 | 44 | 44 | 44 | 44 |
|  | Hexamethylenetetramine | 7 | 7 | 7 | 7 | 7 | 7 | 7 | 7 |
|  | Calcuim hydroxide |  |  |  | 3 |  |  |  | 3 |
|  | Low-molecular polyethylene | | | | | | | | |
|  | Molecular weight = 1000 | 3 | 3 |  |  |  |  |  |  |
|  | Molecular weight = 500 |  |  | 3 | 3 |  | 3 | 3 |  |
|  | Wood flour and others | 46 | 46 | 46 | 43 | 49 | 46 | 46 | 46 |
| Properties | Melt viscosity 100° C. (Pa · s) | $8 \times 10^2$ | $9 \times 10^2$ | $5 \times 10^2$ | $8 \times 10^2$ | $2 \times 10^3$ | $6 \times 10^2$ | $2 \times 10^4$ | $5 \times 10^4$ |
|  | Heat stability 100° C. (sec) | 1800< | 1800< | 1800< | 1800< | 410 | 1800< | 800 | 180 |
|  | Stability in cylinder (min) | 60 | 60 | 90< | 40 | 10 | 60 | 15 | 7 |
|  | Curability (sec) | 25 | 20 | 25 | 20 | 25 | 40 | 20 | 20 |
|  | Injection pressure (kgf/cm²) | 400 | 400 | 250 | 300 | 700 | 250 | 1200 | 1500 |
|  | Formation of flash | o | o | o | o | x | o | x | x |

Formation of flash: o Very little, x Very much

TABLE 2

| | | | Example | | | | Comparative Example (Amount: Part by weight) | | |
|---|---|---|---|---|---|---|---|---|---|
| | | | 5 | 6 | 7 | 8 | 5 | 6 | 7 |
| Novolak resin | | | | | | | | | |
| Number-average molecular weight | | | 405 | 405 | 405 | 395 | 420 | 550 | 850 |
| o/p ratio | | | 1.8 | 1.8 | 1.8 | 2.1 | 1.2 | 2.1 | 0.8 |
| Composition | Novolak resin | | 26 | 35 | 26 | 26 | 26 | 26 | 44 |
| | Bisphenol F | | 18 | 9 | 18 | 18 | 18 | 18 | |
| | Hexamethylenetetramine | | 7 | 7 | 7 | 7 | 7 | 7 | 7 |
| | Calcium hydroxide | | 3 | 3 | 3 | 3 | 3 | 3 | 3 |
| | Low-molecular polyethylene | | | | | | | | |
| | Molecular weight = 500 | | 3 | 3 | 3 | 3 | 3 | 3 | |
| | Resorcin | | | | 3 | 3 | | | |
| | Wood flour and others | | 43 | 43 | 40 | 40 | 43 | 43 | 46 |
| Properties | Melt viscosity 100° C. | (Pa·s) | $3 \times 10^1$ | $6 \times 10^2$ | $5 \times 10^1$ | $7 \times 10^1$ | $3 \times 10^1$ | $4 \times 10^3$ | $5 \times 10^4$ |
| | Heat stability 100° C. | (sec) | 1800< | 1800< | 1800< | 1800< | 1800< | 600 | 180 |
| | Stability in cylinder | (min) | 90< | 75 | 90 | 90 | 90< | 15 | 7 |
| | Curability | (sec) | 30 | 25 | 20 | 26 | 60 | 25 | 20 |
| | Injection pressure | (kgf/cm²) | 150 | 200 | 150 | 150 | 150 | 700 | 1500 |
| | Formation of flash | | o | o | o | o | o | x | x |

Formation of flash: o Very little, x Very much

TABLE 3

| | | | Example | | | Comparative Example (Amount: Part by weight) | | |
|---|---|---|---|---|---|---|---|---|
| | | | 9 | 10 | 11 | 8 | 9 | 10 |
| Novolak resin | | | | | | | | |
| Number-average molecular weight | | | 405 | 405 | 395 | 420 | 550 | 850 |
| o/p ratio | | | 1.8 | 1.8 | 2.1 | 1.2 | 2.1 | 0.8 |
| Composition | Novolak resin | | 44 | 44 | 44 | 44 | 44 | 44 |
| | Hexamethylenetetramine | | 7 | 7 | 7 | 7 | 7 | 7 |
| | Calcium hydroxide | | 3 | 3 | 3 | 3 | 3 | 3 |
| | Monohydric aliphatic alcohol | | | | | | | |
| | 1-propanol | | 1 | | | | | |
| | 1-pentanol | | | 1 | 1 | 1 | 1 | |
| | Low-molecular polyethylene | | | | | | | |
| | Molecular weight = 500 | | 3 | 3 | 3 | 3 | 3 | |
| | Wood flour and others | | 42 | 42 | 42 | 43 | 43 | 46 |
| Properties | Melt viscosity 100° C. | (Pa·s) | $4 \times 10^1$ | $2 \times 10^1$ | $5 \times 10^1$ | $3 \times 10^1$ | $2 \times 10^3$ | $5 \times 10^4$ |
| | Heat stability 100° C. | (sec) | 1800< | 1800< | 1800< | 1800< | 1000 | 180 |
| | Stability in cylinder | (min) | 90< | 90< | 90< | 90< | 20 | 7 |
| | Curability | (sec) | 20 | 20 | 20 | 40 | 25 | 20 |
| | Injection pressure | (kgf/cm²) | 150 | 150 | 150 | 150 | 700 | 1500 |
| | Formation of flash | | o | o | o | o | x | x |

Formation of flash: o Very little, x Very much

TABLE 4

| | | Example | | | | | Comparative Example (Amount: Part by weight) | | | |
|---|---|---|---|---|---|---|---|---|---|---|
| | | 12 | 13 | 14 | 15 | 16 | 11 | 12 | 13 | 14 |
| Novolak resin | | | | | | | | | | |
| Number-average molecular weight | | 405 | 405 | 395 | 405 | 405 | 405 | 420 | 850 | 550 |
| o/p ratio | | 1.8 | 1.8 | 2.1 | 1.8 | 1.8 | 1.8 | 1.2 | 0.8 | 2.1 |
| Composition | Novolak resin | 35 | 35 | 35 | 35 | 35 | 35 | 35 | 35 | 35 |
| | Bisphenol F | 9 | 9 | 9 | 9 | 9 | 9 | 9 | 9 | 9 |
| | Hexamethylenetetramine | 7 | 7 | 7 | 7 | 7 | 7 | 7 | 7 | 7 |
| | Calcium hydroxide | 3 | 3 | 3 | 3 | 3 | 3 | 3 | 3 | 3 |
| | 1-Pentanol | 1 | 1 | 1 | 2 | 1 | 1 | 1 | 1 | 1 |
| | Low-molecular polyethylene | | | | | | | | | |
| | Molecular weight = 500 | 1 | 1 | 1 | 1 | 2 | | 1 | 1 | 1 |
| | Resorcin | | 3 | 3 | 3 | 3 | | | | |
| | Wood flour and others | 44 | 41 | 41 | 40 | 40 | 45 | 44 | 44 | 44 |

TABLE 4-continued

|  |  |  | Example | | | | | Comparative Example (Amount: Part by weight) | | | |
| --- | --- | --- | --- | --- | --- | --- | --- | --- | --- | --- | --- |
|  |  |  | 12 | 13 | 14 | 15 | 16 | 11 | 12 | 13 | 14 |
| Properties | Melt viscosity 100° C. | (Pa · s) | $2 \times 10^2$ | $4 \times 10^2$ | $6 \times 10^2$ | $5 \times 10^1$ | $7 \times 10^1$ | $8 \times 10^2$ | $6 \times 10^2$ | $4 \times 10^2$ | $2 \times 10^3$ |
|  | Heat stability 100° C. | (sec) | 1800< | 1800< | 1800< | 1800< | 1800< | 1800< | 1800< | 1800< | 900 |
|  | Stability in cylinder | (min) | 90< | 90< | 90 | 90< | 90< | 60 | 90 | 90< | 40 |
|  | Curability | (sec) | 20 | 20 | 20 | 20 | 20 | 25 | 30 | 35 | 20 |
|  | Injection pressure | (kgf/cm²) | 150 | 200 | 200 | 150 | 150 | 300 | 300 | 200 | 700 |
|  | Formation of flash |  | o | o | o | o | o | o | o | o | x |

Formation of flash: o Very little, x Very much

As is also clear from the above examples, the phenolic resin molding material of the present invention is high in flowability and heat stability in the molten state and excellent in curability at high temperatures. Therefore, the material is remarkably excellent in moldability, since increase of viscosity of the molding material molten in the cylinder of an injection molding machine is controlled and rapidly cures in the mold in injection molding. Furthermore, formation of flashes can be inhibited, because injection molding can be carried out under low pressures.

Moreover, since the phenolic resin molding material of the present invention has a melt viscosity at 100° C. of $10^3$ Pa.s or lower, which is considerably lower than that of the conventional phenolic resin molding materials ($10^4$–$10^5$ Pa.s), it can be favorably molded using an injection molding machine provided with a screw having a compression ratio of at least 1.5 or a screw having a check ring which is generally used for injection molding of thermoplastic resin molding materials.

What is claimed is:

1. A phenolic resin molding material which contains (a) a high ortho-novolak type phenolic resin having a number-average molecular weight of 350–500 and an ortho-bond/para-bond ratio of 1.5–2.5, (b) hexamethylenetetramine, (c) a low-molecular weight polyolefin compound and (d) a filler.

2. A phenolic resin molding material according to claim 1 which additionally contains (e) a crystalline phenolic compound having two or more benzene rings.

3. A phenolic resin molding material according to claim 1 which additionally contains (g) a monohydric aliphatic alcohol.

4. A phenolic resin molding material according to claim 1 which additionally contains (e) a crystalline phenolic compound having two or more benzene rings and (g) a monohydric aliphatic alcohol.

5. A phenolic resin molding material according to claim 2 which additionally contains (f) a compound having two or more hydroxyl groups on the benzene ring.

6. A phenolic resin molding material according to claim 1, wherein the low-molecular weight polyolefin compound (c) is polyethylene having a number average molecular weight of 500–1500.

7. A phenolic resin molding material according to claim 3, wherein the monohydric aliphatic alcohol (g) has 5 or less carbon atoms and a boiling point of 80°–140° C.

8. A phenolic resin molding material according to claim 1, wherein the amount of hexamethylenetetramine (b) is 7–30 parts by weight per 100 parts by weight of the phenolic resin (a).

9. A phenolic resin molding material according to claim 1, wherein the amount of the low-molecular weight polyolefin compound (c) is 0.1–10 parts by weight per 100 parts by weight of the phenolic resin (a).

10. A phenolic resin molding material according to claim 1, wherein the amount of the resin component including the low molecular weight polyolefin compound (c) and hexamethylenetetramine (b) is 20–70% by weight and that of the filler (d) is 80–30% by weight.

11. A phenolic resin molding material according to claim 2, wherein the blending weight ratio of the phenolic resin (a) to the crystalline phenolic compound (e) is (a)/(e)=20/80–90/10.

12. A phenolic resin molding material according to claim 3, wherein the amount of the monohydric aliphatic alcohol (g) is 1–20 parts by weight per 100 parts by weight of the phenolic resin.

13. A phenolic resin molding material according to claim 4 which additionally contains (f) a compound having two or more hydroxyl groups on the benzene ring.

14. A phenolic resin molding material according to claim 4, wherein the monohydric aliphatic alcohol (g) has 5 or less carbon atoms and a boiling point of 80°–140° C.

15. A phenolic resin molding material according to claim 2, wherein the amount of the low-molecular weight polyolefin compound (c) is 0.1–10 parts by weight per 100 parts by weight of the total amount of the phenolic resin (a) and the crystalline phenolic compound (e).

16. A phenolic resin molding material according to claim 4, wherein the amount of the low-molecular weight polyolefin compound (c) is 0.1–10 parts by weight per 100 parts by weight of the total amount of the phenolic resin (a) and the crystalline phenolic compound (e).

17. A phenolic resin molding material according to claim 4, wherein the blending weight ratio of the phenolic resin (a) to the crystalline phenolic compound (e) is 20/80 to 90/10.

18. A phenolic resin molding material according to claim 4, wherein the amount of the monohydric aliphatic alcohol (g) is 1–20 parts by weight per 100 parts by weight of the phenolic resin.

19. A phenolic resin injection molding material having a melt viscosity at 100° C. of $10^3$ Pa.s or lower, consisting essentially of (a) 100 parts by weight of a high ortho-novolak phenolic resin having a number-average molecular weight of 380–450 and an ortho-bond/para-bond ratio of 1.8–2.3, (b) 12–20 parts by weight of hexamethylenetetramine, (c) 0.1–10 parts by weight of a low-molecular weight polyethylene having a number average molecular weight of 300–3,000, (d) filler in an amount of 80–30% by weight based on the total weight of said composition, (e) optionally a crystalline phenolic compound having at least two benzene rings, solid at room temperature and forming a low viscosity melt at injection molding temperatures, said crystalline phenolic compound (e) when present being in an amount in a ratio with said phenolic resin of (a)/(e)=20/80 to 90/10, (f) optionally a compound for improving curing rate while maintaining low viscosity, said compound (f) having two or more hydroxyl groups on a benzene ring, when present being in an amount based on the total amount of (a) and (e) in the ratio [(a)+(e)]/(f)=99/1 to 90/10, and (g) optionally 1–20 parts by weight of a monohydric alcohol having 5 or fewer carbon atoms and a boiling point of 80°–140° C.

20. An injection molded product formed from the composition of claim 19.

* * * * *